United States Patent
Jones et al.

(10) Patent No.: US 8,651,924 B1
(45) Date of Patent: Feb. 18, 2014

(54) INTERLOCKING VENT ASSEMBLY FOR EQUALIZING PRESSURE IN A COMPARTMENT

(75) Inventors: Timothy M. Jones, Lake Stevens, WA (US); Russell W. Keck, Seattle, WA (US)

(73) Assignee: The Boeing Company, Chicago, IL (US)

( * ) Notice: Subject to any disclaimer, the term of this patent is extended or adjusted under 35 U.S.C. 154(b) by 711 days.

(21) Appl. No.: 12/775,438

(22) Filed: May 6, 2010

(51) Int. Cl.
*B64D 13/02* (2006.01)

(52) U.S. Cl.
USPC .............. 454/71; 454/70; 454/76; 244/118.5

(58) Field of Classification Search
USPC .............. 454/70, 71, 76; 244/118.5; 52/592.1
See application file for complete search history.

(56) References Cited

U.S. PATENT DOCUMENTS

| | | | | |
|---|---|---|---|---|
| 1,462,343 A * | 7/1923 | Jenkins | | 160/90 |
| 1,514,643 A * | 11/1924 | Wine | | 454/88 |
| 1,570,089 A * | 1/1926 | Schwartzberg | | 52/473 |
| 1,816,314 A * | 7/1931 | Canney | | 454/94 |
| 1,951,653 A * | 3/1934 | Green | | 52/473 |
| 2,194,137 A * | 3/1940 | Copersito | | 454/195 |
| 2,395,619 A * | 2/1946 | Fischer et al. | | 454/81 |
| D146,133 S | 12/1946 | Gladen | | |
| 2,509,016 A * | 5/1950 | Peterson | | 454/279 |
| 2,802,410 A * | 8/1957 | Robinson | | 454/279 |
| 2,820,407 A * | 1/1958 | Smith | | 454/279 |
| 2,828,711 A * | 4/1958 | Raudall et al. | | 52/473 |
| 3,181,661 A * | 5/1965 | Cochran | | 52/473 |
| 3,584,567 A * | 6/1971 | Roach | | 454/73 |
| 3,645,195 A * | 2/1972 | Koval | | 454/277 |
| 3,952,542 A * | 4/1976 | Berkowitz | | 62/409 |
| 3,968,738 A * | 7/1976 | Matzke | | 454/309 |
| 4,021,967 A * | 5/1977 | Mulder et al. | | 49/171 |
| 4,276,725 A * | 7/1981 | Ash | | 52/167.9 |
| 4,319,898 A * | 3/1982 | Maierhofer | | 55/322 |
| 4,383,666 A * | 5/1983 | Allerding et al. | | 244/118.5 |
| 4,390,152 A * | 6/1983 | Jorgensen | | 244/118.5 |
| 4,432,514 A * | 2/1984 | Brandon | | 244/118.5 |
| 4,452,024 A * | 6/1984 | Sterriker et al. | | 52/473 |
| 4,498,261 A * | 2/1985 | Wilson et al. | | 52/1 |
| 4,644,687 A * | 2/1987 | Liou | | 49/38 |
| 4,662,270 A * | 5/1987 | Fiddler et al. | | 454/195 |
| 4,667,702 A * | 5/1987 | Roth | | 138/162 |
| RE32,554 E * | 12/1987 | Murphy | | 244/118.5 |
| 4,726,550 A * | 2/1988 | Chen et al. | | 244/137.2 |
| D298,853 S | 12/1988 | Waltz et al. | | |
| 4,899,960 A * | 2/1990 | Hararat-Tehrani et al. | | 244/118.5 |
| 5,069,401 A * | 12/1991 | Shepherd et al. | | 244/118.5 |
| 5,085,017 A | 2/1992 | Hararat-Tehrani | | |

(Continued)

FOREIGN PATENT DOCUMENTS

JP 03151486 A * 6/1991 .............. E06B 7/082

*Primary Examiner* — Steven B McAllister
*Assistant Examiner* — Jonathan Cotov
(74) *Attorney, Agent, or Firm* — Farid Piroozmandi; Clifford G. Cousins (57) ABSTRACT

A method for privately transferring filtered air through a partition of a compartment in an aircraft cabin to equalize a pressure difference between the inside and outside the compartment via a vent assembly comprising two substantially structurally identical vent halves joining together in a locking manner through a vent opening in the partition. Each vent half comprising integrally molded rim, frame, plurality of louvers fixed within the frame, latch, keeper, guide prong, and a installation index key; plastic injection molded from high strength unreinforced polycarbonate.

19 Claims, 5 Drawing Sheets

(56) References Cited

U.S. PATENT DOCUMENTS

| | | | | |
|---|---|---|---|---|
| 5,105,849 | A * | 4/1992 | Clough | 137/512.15 |
| 5,118,053 | A * | 6/1992 | Singh et al. | 244/118.5 |
| 5,120,273 | A * | 6/1992 | Lin | 454/195 |
| 5,133,168 | A * | 7/1992 | Neilly et al. | 52/204.5 |
| 5,137,231 | A * | 8/1992 | Boss | 244/118.5 |
| D351,903 | S | 10/1994 | Whitley, II | |
| 5,368,822 | A | 11/1994 | McNeil | |
| 5,419,739 | A | 5/1995 | Lewis | |
| 5,421,775 | A * | 6/1995 | Honda | 454/274 |
| D362,059 | S | 9/1995 | Wojcik | |
| 5,452,641 | A * | 9/1995 | Kariya | 89/36.14 |
| 5,644,881 | A * | 7/1997 | Neilly | 52/455 |
| 5,673,526 | A | 10/1997 | Schiedegger et al. | |
| 5,823,870 | A | 10/1998 | Emerling et al. | |
| 5,871,178 | A * | 2/1999 | Barnett et al. | 244/118.5 |
| 6,029,933 | A * | 2/2000 | Holman et al. | 244/118.5 |
| 6,076,862 | A | 6/2000 | Barth et al. | |
| 6,129,312 | A * | 10/2000 | Weber | 244/118.5 |
| 6,165,419 | A | 12/2000 | Bullock et al. | |
| 6,167,658 | B1 * | 1/2001 | Weiner | 52/2.11 |
| 6,176,776 | B1 * | 1/2001 | Finkelstein et al. | 454/195 |
| 6,210,266 | B1 * | 4/2001 | Barton | 454/162 |
| 6,264,141 | B1 * | 7/2001 | Shim et al. | 244/118.5 |
| 6,306,032 | B1 * | 10/2001 | Scheffler et al. | 454/71 |
| 6,336,293 | B1 * | 1/2002 | Kamimura | 49/171 |
| 6,431,980 | B1 * | 8/2002 | Achen | 454/271 |
| 6,435,455 | B1 * | 8/2002 | Holman et al. | 244/118.5 |
| D466,605 | S | 12/2002 | Ziegler | |
| 6,497,230 | B1 * | 12/2002 | Higgins et al. | 126/285 R |
| 6,669,144 | B2 * | 12/2003 | Artsiely | 244/129.5 |
| 6,672,195 | B1 * | 1/2004 | Plattner | 89/36.11 |
| 6,702,230 | B2 * | 3/2004 | Movsesian et al. | 244/118.5 |
| 7,010,888 | B2 * | 3/2006 | Tumlin et al. | 52/204.56 |
| D518,566 | S | 4/2006 | Bratton et al. | |
| D520,620 | S | 5/2006 | Wang | |
| D521,146 | S | 5/2006 | Rodriguez et al. | |
| D521,630 | S * | 5/2006 | Achen | D23/386 |
| 7,654,487 | B2 * | 2/2010 | Ghoreishi et al. | 244/118.5 |
| 7,690,598 | B1 * | 4/2010 | Plattner | 244/129.1 |
| 7,789,740 | B2 * | 9/2010 | Janesky | 454/251 |
| 7,797,904 | B2 * | 9/2010 | Wang Chen | 52/592.1 |
| 7,909,686 | B2 * | 3/2011 | Achen | 454/283 |
| D639,416 | S * | 6/2011 | Jones et al. | D23/393 |
| 8,112,961 | B2 * | 2/2012 | Wang Chen | 52/592.1 |
| 8,117,794 | B2 * | 2/2012 | Wang Chen | 52/592.1 |
| 8,201,775 | B2 * | 6/2012 | Treimer et al. | 244/118.5 |
| 8,240,604 | B2 * | 8/2012 | Opp et al. | 244/118.5 |
| 8,342,921 | B2 * | 1/2013 | Huber et al. | 454/76 |
| 2002/0098793 | A1 * | 7/2002 | Achen | 454/271 |
| 2002/0124495 | A1 * | 9/2002 | Layne et al. | 52/220.1 |
| 2003/0022616 | A1 * | 1/2003 | Stiehl | 454/162 |
| 2003/0052227 | A1 * | 3/2003 | Pittman | 244/118.5 |
| 2003/0192989 | A1 * | 10/2003 | Owen et al. | 244/118.5 |
| 2004/0014421 | A1 * | 1/2004 | Raymer | 454/271 |
| 2005/0183350 | A1 * | 8/2005 | Tortorella, Jr. | 52/204.1 |
| 2005/0257429 | A1 * | 11/2005 | Yorgason | 49/82.1 |
| 2007/0108353 | A1 * | 5/2007 | Bikowsky et al. | 248/71 |
| 2008/0283033 | A1 * | 11/2008 | Michaud et al. | 126/110 A |
| 2008/0290217 | A1 * | 11/2008 | Ghoreishi et al. | 244/129.4 |
| 2009/0148236 | A1 * | 6/2009 | Achen | 405/92 |
| 2009/0205283 | A1 * | 8/2009 | Wang Chen | 52/592.1 |
| 2009/0311138 | A1 * | 12/2009 | Klaptchuk | 422/30 |
| 2010/0173122 | A1 * | 7/2010 | Susnjara | 428/119 |
| 2010/0187358 | A1 * | 7/2010 | Voss et al. | 244/129.4 |
| 2010/0320318 | A1 * | 12/2010 | Roth et al. | 244/118.5 |
| 2011/0143643 | A1 * | 6/2011 | Graham | 454/173 |
| 2011/0225912 | A1 * | 9/2011 | Achen | 52/302.1 |

\* cited by examiner

INTERLOCKING VENT ASSEMBLY FOR EQUALIZING PRESSURE IN A COMPARTMENT

FIELD

This patent relates to vents for use in closed spaces such as aircraft cabins. It is desirable to equalize air pressure in an aircraft cabin to avoid unnecessary pressure induced stress. Air vents are typically installed on partitions of compartments within the aircraft cabin.

BACKGROUND

Aircraft cabin tolerances are close and ambient airflow is limited.

Existing vents are difficult to install, or require special tools to install. Some are expensive. Others require multiple dissimilar members that must be warehoused and matched to form a vent set. Others exhibit a weight that makes them unsuitable for multiple installations within an aircraft cabin. Still others are not capable of performing in typical aircraft operating conditions.

Accordingly there is a long felt and unfulfilled need for a lightweight suitable vent for aircraft usage that can withstand typical aircraft operating cycles, is easy to install and has a minimum parts count to thereby efficiently and cost-effectively control cabin airflow and also allow pressure to be equalized.

SUMMARY

The vents are simple to manufacture, less expensive, lighter in weight, fewer parts and corresponding part numbers and are easier to install.

In one advantageous embodiment the air vent comprises two substantially structurally identical vent halves, made by plastic injection molding of high strength unreinforced polycarbonate, joined together in a locking manner. The two halves can be made from successive presses of a single mold, reducing production cost and part numbers. Each half comprises an integrally molded rim, frame, a plurality of louvers fixed within the frame, a latch, a keeper, a guide prong for joining the halves together, and an installation index key to facilitate proper orientation installation of the vent on a compartment partition, and the vent louvers are arranged to provide visual privacy of content of the compartment.

The advantageous vent embodiment is installed on a compartment partition by inserting the vent halves, inverted with respect to each other, from either side of a partition through a vent opening in the partition and joining them in a locking manner. The vent provides for air transfer through the partition vent hole for equalizing the pressure difference between inside and outside the compartment. The plurality of the louvers within the frame of each of the vent halves are substantially equally spaced and are vertically skewed or offset in respect to their position within the frame, and when joined in an inverted back-to-back manner provide for a labyrinth or staggered flow passage that enables filtering particle flow through the compartment partition.

The features, functions, and advantages of this vent and method of air transfer through a compartment partition can be achieved independently in various embodiments of the present disclosure or may be combined in yet other embodiments in which further details can be seen with reference to the following description and drawings.

BRIEF DESCRIPTION OF THE DRAWINGS

The novel features characteristic of the embodiments of this novel vent are set forth in the appended claims. The advantageous embodiments, however, as well as a preferred mode of use, further objectives and advantages thereof, can be understood by reference to the following detailed description of the preferred and alternate embodiments of the present disclosure when read in conjunction with the accompanying drawings, wherein:

FIGS. 4 A and B is an illustration of a partition wall of a compartment in an aircraft cabin with a vent hole and an illustration of a vent installed in a partition wall of a compartment in an aircraft cabin.

DETAILED DESCRIPTION

By way of introduction, the present disclosure teaches an air vent to transfer air between a compartment and its surrounding space. The vents can help equalize pressure between inside and outside of a compartment to relieve unnecessary pressure differential stress. These vents allow for a transfer of air to and from a compartment to thereby equalize the pressure between inside and outside the compartment to prevent distortion of the partitions due to the induced force due to pressure difference. The vent described herein is lightweight and is comprised of two substantially structurally identical molded halves cleverly joined together to form a pressure control vent for installation through a partition of a compartment within an aircraft cabin. The disclosed vent minimizes parts count and is easy to install.

Figure 1:
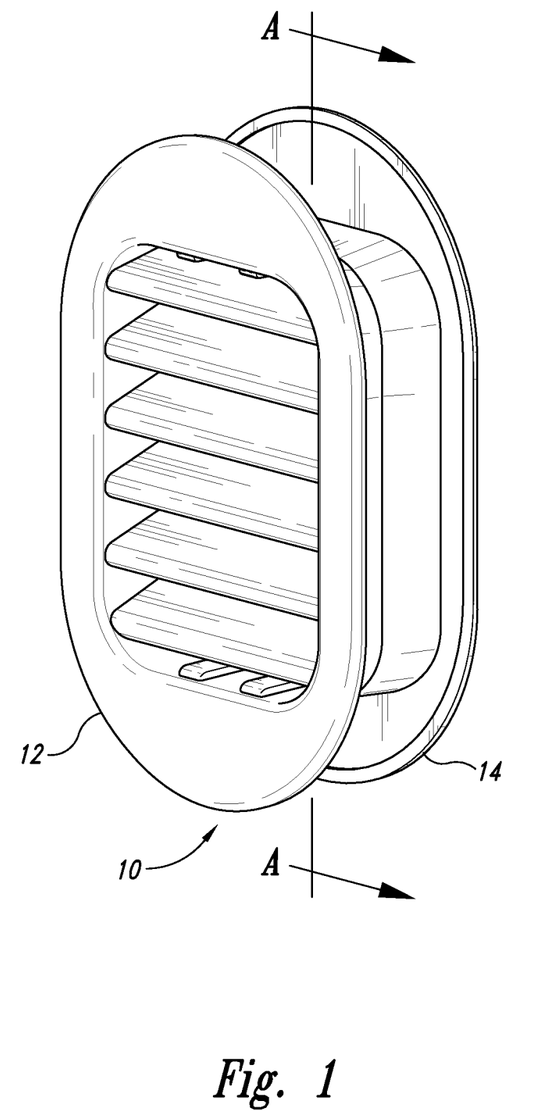
FIG. 1 is an illustration of an assembled and uninstalled vent including two interlocking joined together halves.

FIG. 1 shows an assembled and uninstalled vent 10 comprising first and second halves 12 and 14 respectively joined in back-to-back relation. As can be seen from FIG. 2, and explained in more detail in conjunction therewith, the first and second halves 12 and 14 are aligned in inverted back-to-back relation to establish a locked joint.

Figure 2:
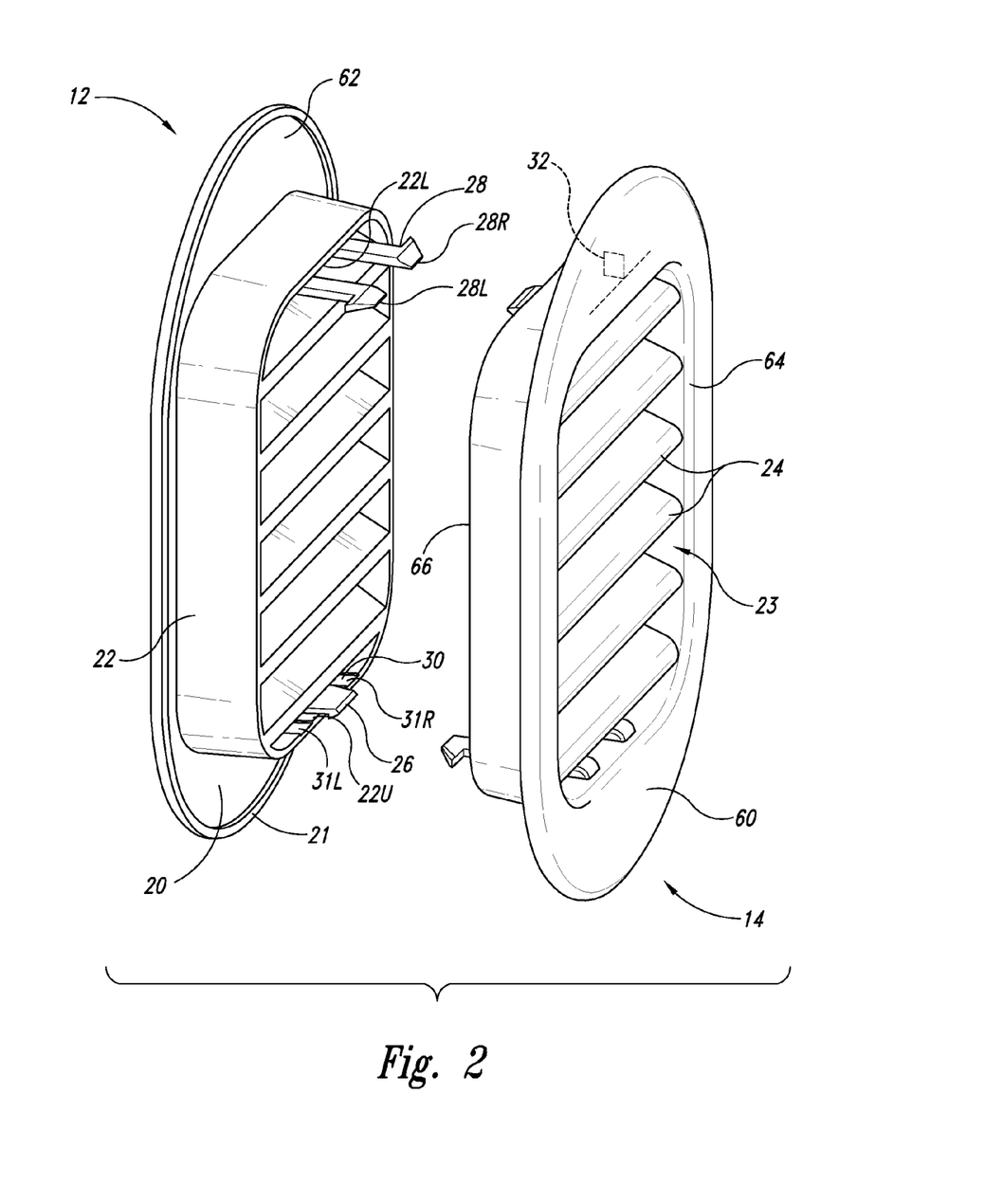
FIG. 2 is an exploded illustration of the two substantially structurally identical halves of an unassembled vent.

Referring now to FIG. 2, the first and second vent halves 12 and 14 are shown in exploded and inverted relation. Each half comprises a rim 20, a frame 22, a plurality of louvers 24, a guide prong 26, a latch 28, a keeper 30 and an installation orientation index key 32.

The rim 20 has a substantially planar face 60 plate integral with and surrounding the frame 22. The rim's substantially planar face comprise the face of the vent half 12 and 14. The rim 20 further has a substantially planar back 62. The rim 20 supports, interfaces and mounts the vent 10 to a compartment wall 50 shown in FIG. 5 and includes an inwardly facing rib 21 about the inside perimeter of the rim 20. The rim 20, while shown in oval design, can assume any desired substantially planar shape.

The frame 22 has an oval shape circumscribing a hollow center 23. The frame's 22 substantially planar face 64 is integral with rear surface 62 of the rim 20. The Vent's substantially planar back 66 comprise the frame back and the inside edges of the louvers 24 vent half 12 and 14. The frame 22 extends in an upright direction that is preferably substantially perpendicular to the rear side 62 of the substantially planar rim 20. Frame 22 fixedly holds a plurality of louvers 24 within its hollow center 23 to direct airflow. The frame 22 supports, couples and mounts the vent 10 to a compartment wall 50 (FIG. 5) by protruding into a vent aperture on the compartment wall 50 (FIG. 5) approximately 2.3 by 3.2 inches.

The plurality of louvers 24, are integral with and fixedly attached to the frame 22 spanning the hollow center 23 at an inclined angle with respect to the frame's substantially planar rim 20.

The guide prong 26, allows for easy alignment of the first and second vent halves 12 and 14 and their receptive latches 28 and keepers 30 for joining in a locking manner. The guide prong 26 comprises an extended prong and is fixedly mounted and protrudes from the inside of the hollow center of the frame 22 at the upper end of the frame 22U toward the back of the frame 22.

The latch 28, is fixedly mounted on the inside of the frame 22 at the lower end of the frame 22L toward the back edge of the frame 22. The latch 28 comprises two substantially parallel oppositely pointed compressible bayonet tip members 28L and 28R for contracted insertion between the guide prong 26 and the adjacent keeper block 31L and 31R.

The latch keeper 30, fixedly retains the latch 28. The keeper 30 comprises two rectangular blocks 31L and 31R that are fixedly mounted on the inside of the frame 22 at the upper end 22U toward the back of the frame 22 such that one keeper block is located on either side of the guide prong 26.

The installation index key 32, is fixedly mounted on the outside of the hollow center of the frame 22 at the upper end of the frame 22U and the intersection of the inward face of the rim 20. This key 32 marks the approximate center of the vent 10 and is useful to align the center of the first vent half 12 with the center of the partition opening and similarly align the center of the second vent half 14 in the partition opening to thereby align vent halves 12 and 14 with each other. The installation index key 32 is further used to align proper orientation of the installed vent 10 on compartment partition so that the inclined louvers 24 provide line of sight visual privacy of the interior of the compartment.

Figure 3:
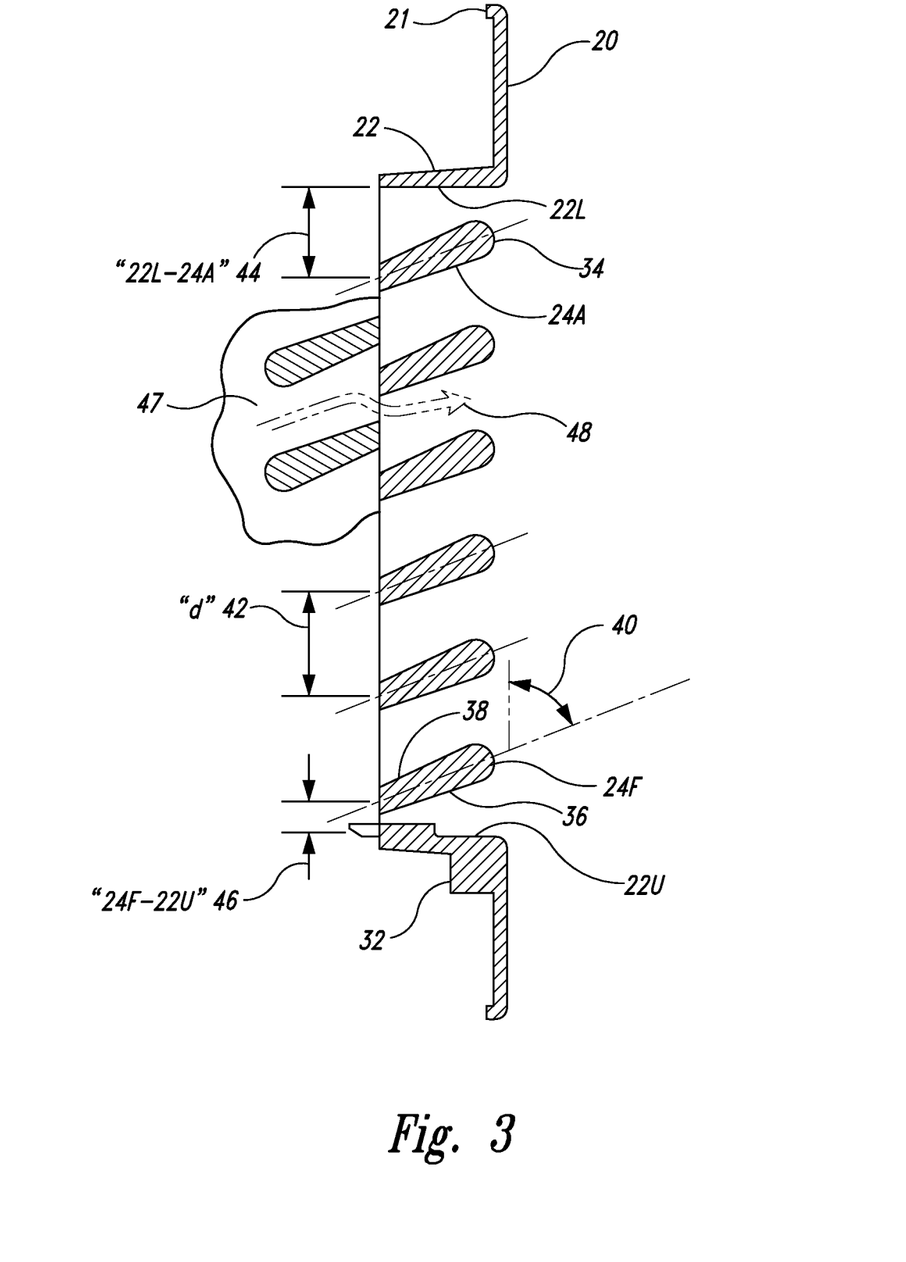
FIG. 3 is an illustration of the cross sectional view of a half and part of the joining adjacent half, showing the staggered positioning of the airfoil shape louvers taken along lines A-A of FIG. 1.

FIG. 3 illustrates a cross sectional view of a second vent half 14 and part of the joining adjacent half 12, showing the staggered positioning 47 of the airfoil shape 34 louvers taken along lines A-A of FIG. 1. As detailed in FIG. 3 the integrally molded louvers 24 within the frame 22 of the second vent half 14 form a prespecified angle 40 with the substantially planar face of the rim 20. In the embodiment the angle 40 is in the range of 45 to 75 degrees and preferably is approximately 68 degrees, this angle helps control the air flow.

The louvers 24 have a substantially airfoil shape 34 with their thicker leading edge 36 toward the face of the frame 22. In the illustrated embodiment the leading edge 36 is about 0.17 inches thick. The thinner trailing edge 38 of the airfoil shaped 34 louvers 24 is toward the back of the frame, where the joining halves 12 and 14 come together. In the disclosed embodiment the trailing edge 38 is about 0.12 inches thick.

As illustrated in FIG. 3, the plurality of the louvers 24 are vertically spaced substantially equidistant from each other by a length "d". In the illustrated embodiment the length "d" is approximately 0.5 inches. The plurality of the louvers 24 are not vertically centrally positioned within the frame 22. The first louver 24A of the group of the louvers 24 is positioned within the frame 22 such that the distance 44 "22L-24A" between the first louver 24A in the group of louvers 24 and the lower end of frame 22L is about the same as the distance between the louvers 42 "d". An offset spacing is provided by spacing distance 46 "24F-22U" between the last louver 24 in the group of louvers 24 and the upper end of the frame 22U is about half the spacing distance between the louvers 24 or ½"d" 46. This offset provides for skewed vertical positioning of the louvers 24 within the frame 22, and allows the louvers to substantially align in parallel and offset planes relationship providing for a staggered adjacent louver plane 47 when placed back to back to limit the size of particles in the air flow. In the illustrated embodiment the positioning of the staggered adjacent louver plane 47 provides for a discontinuous air flow passage 48 that limits the individual flow paths to about 0.125 inches filtering any particle larger than ⅛ of an inch in the air flow.

The cross sectional area of the vent or vent area can be adjusted to suit the particular application. In a typical aircraft embodiment, an effective vent area of approximately 2.56 square inches and an overall dimension of approximately 4.75"×3" for each single vent 10 has been found to provide satisfactory airflow under even extreme circumstances.

The depth or thickness of each vent half is approximately equal to half the thickness of a wall partition. Closely approximating vent 10 thickness with a partition thickness ensures that the vent 10 will fit tightly against the partition and provide a sealed installation wherein the rib 21 protrusion causes the rim 20 to slightly deflect and exert a sealing pressure on the partition 50 upon installation of vent 10.

An offset spacing ½d provided by spacing distance between the last louver 24 in the group of louvers 24 and the upper end of the frame 22 allows the louvers to substantially align in parallel and offset plane relationship when assembled in aligned back to back relation to limit the size of particles entrained in the air flow through the louver flow maze.

In a typical construct in our aircraft application, the dimension "d" is in the range of 0.125"-0.5" and preferably approximately 0.5". This dimension provides strong louvers 24 that satisfy the airflow requirements and also provides for minimal obstruction and fierce flow passageways.

The Vent 10 has an overall thick of approximate 1.4 inches. The first and second vents halves 12 and 14 have thickness of approximately 0.68 inches. The rim 20 extends approximately 0.3 to 0.75 inches from the frame 22 based on its oval shape. The frame has depth of approximately 0.58 inches.

The prong 26 is approximately 0.4 inches wide and extends out approximately 0.15 inches beyond the back of frame 22. The latch 28 is approximately 0.2 inches wide and extends out approximately 0.4 inches beyond the back of the frame 22. The keeper 30 is approximately 0.15×0.35 inches and do not extend beyond the back of the frame 22. The index key 32 is approximately 0.25×0.25×0.05 inches.

The disclosed vent 10 can be efficiently manufactured for new or retrofit application from a successive presses of a single mold because the vent 10 is uniquely structured from a combination of two identical vent halves 12 and 14. This unique manufacturer also reduces the number on the unique parts that a supplier or installer must stock to routinely use these vents 10. The vent halves 12 and 14 can be molded from a wide variety of materials including nylons and different plastics and polycarbonates with high strength unreinforced polycarbonate being preferred. Polycarbonate has excellent molding properties and offer high strength needed to properly manage the requisite air flows. More particularly, polycarbonate having a thickness of approximately 0.06" in the rim 20 area and louvers of approximately 0.12 to 0.17 inches thickness, is lightweight.

The first and second vent halves 12 and 14 are joined in a double latched, inverted back to back relation as the halves are placed back to back, wherein the latch 28 of the first vent half 12 is positioned opposite the keeper 30 the second vent half 14 and the keeper 30 of the first vent half 12 is positioned opposite the latch 28 of the second vent half 14. The guide prongs 26 of the first and second vent halves 12 and 14 guide the latch pointed compressible bayonet tip members 28L and 28R to insertion between the guide prong 26 and the adjacent keeper block 31L and 31R to locking engage the keeper 30.

Figure 4A:
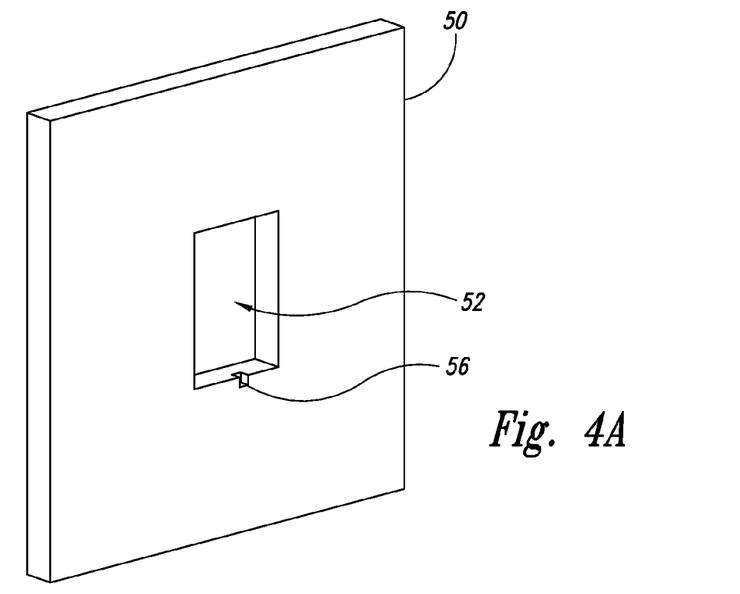
Figure 4B:
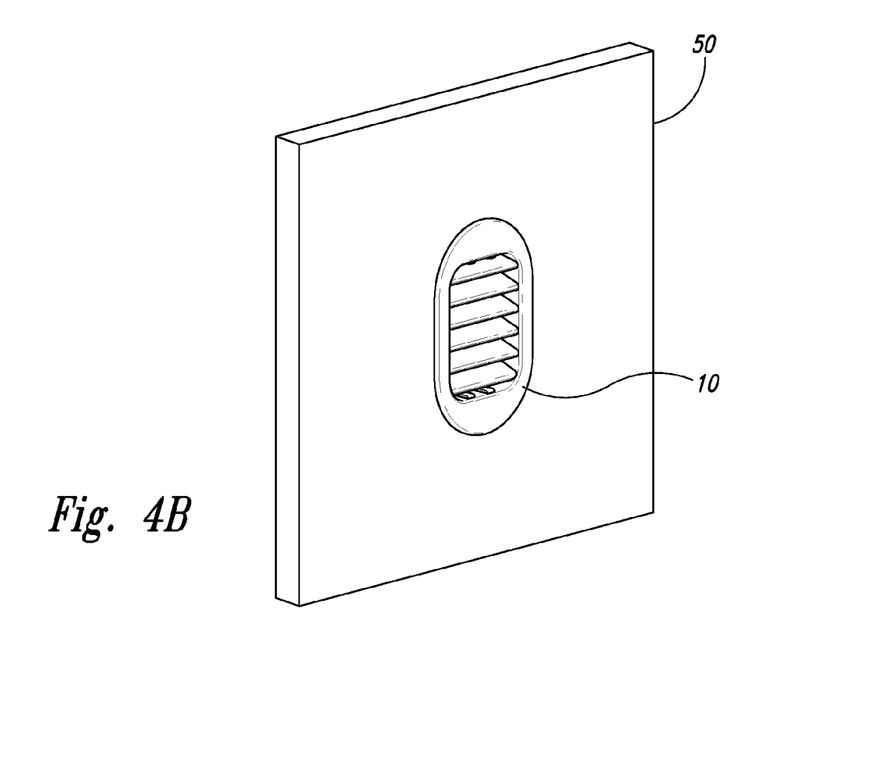

FIG. 4 A is an illustration of a partition 50 of an aircraft cabin having a vent opening 52 in it. In operation and use, with reference to FIG. 4 B, the first and second vent halves 12 and 14 are inserted from opposite sides of a partition 50 into an opening 52 created to accommodate the frame 22, but not the rim 20.

With the assistance in the installation key 32, the first and second vent halves 12 and 14 align with and insert into and partially through the partition an opening 52 and pressed together to lock into an aligned and connecting in locking relationship with each other to form an installation through partition vent 10. The inwardly facing rib 21 contacts and engages the face of the partition 50 to establish an airtight seal between the vent rim 20 and the partition 50. This provides for sealed and controlled flow through the vent, prevents distortion and eliminates the possibility that the vent 10 can become separated from the partition 50.

Upon insertion of the latch 28 within the keeper 30, the trailing edge right bayonet tip 28R engages the inside edge of the left keeper block 31L and the trailing edge left bayonet tip 28L engages the inside edge of the right keeper block 31R forming a positive biased and releasable joint between them.

Figure 5:
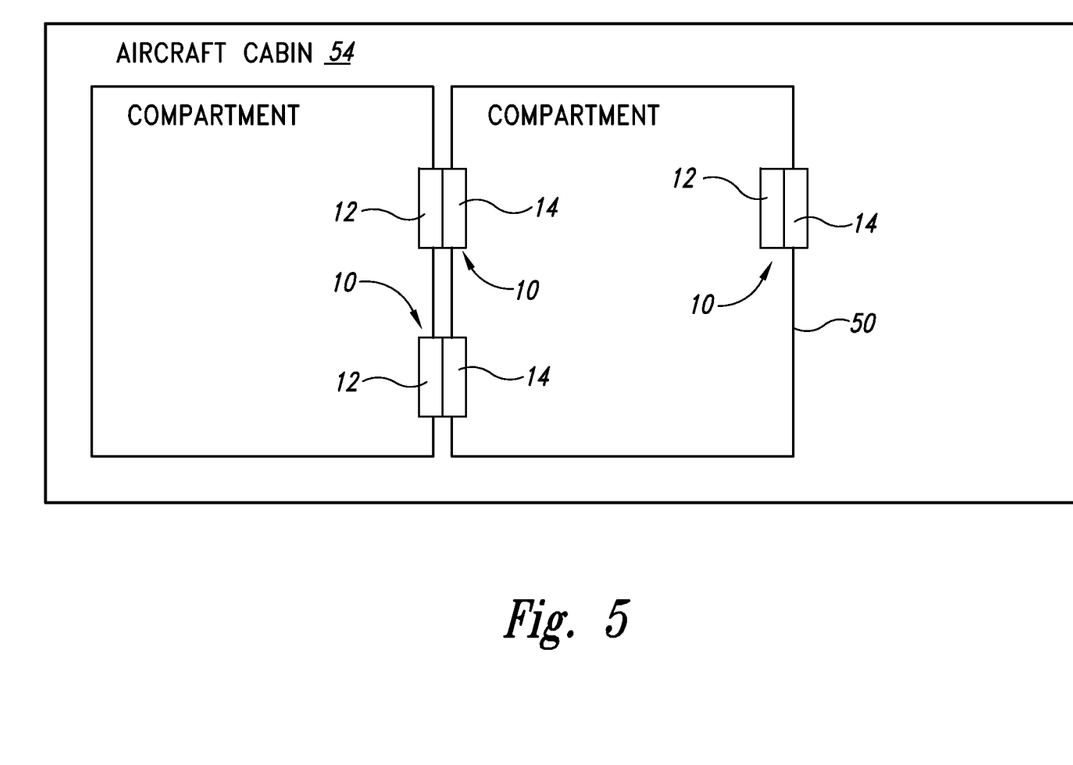
FIG. 5 is an illustration of a method for privately transferring air through a partition of a compartment in an aircraft cabin to substantially equalize a pressure difference between the inside and outside the compartment.

As is illustrated in FIG. 5 and taught herein, a method for privately transferring air through a partition of a compartment in an aircraft cabin to equalize a pressure difference between the inside and outside the compartment at pressures of 4.7 psid or more, is provided including one or more of the steps. A pressure control opening thru a partition 50 in an aircraft cabin 54 such as a lavatory partition wall. The disclosed vent 10 comprising a two piece high strength polycarbonate vent 10 having substantially structurally identical first and second vent halves 12 and 14 is inserted through opposite sides of the partition. The vent halves 12 and 14 are inverted with respect to each other. Each vent half 12 and 14 comprising an integrally molded mounting rim 20, rib 21, frame 22 and plurality of fixed louvers 24, the louvers being located to form a pre-specified angle with the face of the frame, inserting a first vent half 12 into the partition opening 52 from a first side of the partition 50 and a second vent half 14 invented with respect to the first vent half 12 into the partition opening 52 from a second side of the partition 50, aligning and joining the frames 22 of the vent halves 12 and 14 via an alignment notch 56 on the partition opening 52, whereby the fixed louvers 24 of each vent half 12 and 14 are positioned in staggered adjacent relation 47 to each other to form a discontinuous louvered filtering flow path 48 to facilitate the flow of filtered air through the vent 10 and provide visual privacy, latching the vent halves 12 and 14 to each other, and transferring air from one side of the partition 50 to the other side of the partition 50 through the vent 10.

In operation, the vent 10 is installed on a partition 50 within an aircraft cabin 54. The louvers 24 are staggered to provide a restricted airflow so that items no larger than 0.125 in size should pass through an air vent of a compartment. The staggered louvers eliminate the need for a separate screen and allows the vent itself to provide the required filtering. The proposed embodiment further utilizes staggered louvers to provide visual privacy for the content of the compartment. This ensures that the vent will remain in place during all operating conditions that can be experienced in a typical aircraft cabin. Under high pressure situations, the vent 10 can help equalize pressure of 4.7 pounds per square inch or more within and outside compartments.

Accordingly the disclosed vent 10 address a long felt and as yet unfulfilled need for a lightweight vent suitable for aircraft use that can withstand typical aircraft operating cycles and can be easy to installed while minimizing the parts count to thereby efficiently and cost-effectively control cabin airflow and also allow pressure to be equalized.

While the preferred embodiment of the vent 10 has been illustrated and described, as noted above, many changes can be made without departing from the spirit and scope of the invention. The materials, dimensions, locking mechanism can be altered or adapted to suit particular circumstance. Accordingly, the scope of the patent protection to be afforded to this novel vent is not limited by the disclosure of the preferred embodiment herein. Instead, the scope of the patent protection to be afforded to this novel vent should be determined entirely by reference to the claims that follow.

What is claimed is:

1. A method for privately transferring air through a partition of a compartment in an aircraft cabin, the method comprising the steps of:
installing a vent assembly through the partition of the compartment, the vent assembly comprising:
a first and second substantially identical vent halves joining in a locking manner,
each substantially identical vent half further comprising a guiding prong, a plurality of latching prongs having latching tips on their distal ends, a plurality of keeping prongs, a plurality of louvers, an installation orientation index key for providing orientation of the vent in the compartment partition,
where the keeping prongs comprise a plurality of rectangular blocks which interact with the latching tips to maintain a fix coupling between the vent halves, and
the louvers on one vent half, with the vent halves joined together, are not in contact with the louvers on the joining vent half, enabling a solid particle filtering, staggered flow pattern through the vent;
and ventilating the compartment through the vent assembly.

2. The air transfer method of claim 1, where the vent halves are high strength unreinforced polycarbonate plastic.

3. The air transfer method of claim 1, where the fixed louvers within the vent half frame are at about a 68 degree angle with the substantially planar face of the frame at a spacing of about 0.5 inches between the louvers, the louvers have a thickness of about 0.12 inches.

4. The air transfer method of claim 1, where the vent can withstand a pressure of 4.7 psid or more equalizing the pressure across the partition.

5. A pressure control vent for installation in a compartment partition of an aircraft cabin to promptly equalize pressure differentials to avoid structural distortion comprising:
a first and second substantially identical vent halves joining in a locking manner,
each substantially identical vent half further comprising a guiding prong, a plurality of latching prongs, a plurality of keeping prongs having latching tips on their distal ends, a plurality of louvers, an installation orientation index key for providing orientation of the vent in the compartment partition, where the keeping prongs comprise a plurality of rectangular blocks which interact with the latching tips to maintain a fixed coupling between the vent halves, and the louvers on one vent half, with the vent halves joined together, are not in contact with the louvers on the joining vent half, enabling a solid particle filtering, staggered flow pattern through the vent.

6. The pressure control vent of claim 5, wherein each vent half comprises high strength unreinforced polycarbonate plastic and includes an integrally molded mounting rim, a frame, the plurality of fixed louvers within the frame, and the plurality of latching, guiding and keeping prongs.

7. The pressure control vent of claim 5, wherein each vent half is made of a material selected from the group consisting of plastic, nylon, and metal.

8. The pressure control vent of claim 5, wherein each vent half is manufactured by a method selected from the group consisting of injection molding, machining, and stamping.

9. The pressure control vent of claim 6, where the frame has a substantially planar face and a substantially planar back,
the rim has a substantially planar face and a substantially planar back,
the face of the rim comprise the face of the vent half, and
the back of the frame comprise the back and the inward direction of the vent half.

10. The pressure control vent of claim 6, wherein the individual louvers have a substantially air foil shape with a thicker leading edge toward the face of the vent half, and a thinner trailing edge toward the back of the vent half.

11. The pressure control vent of claim 6, wherein the installation orientation index key is fixed on the outside of the frame at the intersection of the frame and the back of the rim, where the installation orientation index key couples to an alignment notch on the compartment partition to provide for installation orientation of the vent with respect to the compartment partition.

12. The pressure control vent of claim 6, wherein the louvers form a prespecified angle with the frame; when installed, providing for line-of-sight privacy of the interior of the compartment from outside of the compartment and providing for line-of-sight visibility to the exterior of the compartment from inside of the compartment, or vice versa, with the line of sight at a same elevation on either side of the vent, with the vent half of an opaque plastic material.

13. The pressure control vent of claim 6, wherein the group of the substantially identical and equally spaced louvers within the vent half frame is not longitudinally centered in the frame.

14. The pressure control vent of claim 6, wherein the louvered vent halves are joined together back to back in an inverted and locking relation by insertion from opposite sides and through a partition.

15. The pressure control vent of claim 5, which when the vent halves are assembled they are capable of withstanding a pressure differential.

16. The pressure control vent of claim 13, wherein the frames of the first and second vent halves are aligned and joined in inverted relation with the louvers of each half adjacent in staggered relation to each other, with the louvers of one vent half not in contact with the louvers of the joining vent half, forming a discontinuous louver plane to facilitate a filtered flow of air through the vent and provide visual privacy from only one side of the vent.

17. The pressure control vent of claim 5, wherein each vent half comprise the latching, guiding and keeping prong where the keeping prongs comprise a plurality of rectangular blocks, which upon aligned vent engagement simultaneously joins the vent halves to each other, back to back, in a locking manner to form the vent for transferring air from one side of the partition to the other side of the partition.

18. The pressure control vent of claim 6, wherein the louvers are located to form an approximately 68 degree angle with the substantially planar face of the frame,
wherein the substantially equal spacing between the louvers is about 0.5 inches,
wherein the longitudinal fixed position of the group of the louvers within the frame is such that the distance between the first louver in the louver group from the frame is about 0.5 inch and the distance between the last louver in the louver group from the frame is about 0.25 of an inch, to provide for the longitudinal skewed positioning of the louver group within the frame of the vent half.

19. The pressure control vent of claim 13, wherein the longitudinal skewed positioning of the louver group within the frame of the vent half provides for a staggered positioning of adjacent louver ends from the back to back joining of the vent halves such that each of the discontinuous air flow passages across the opposing louvers in the vent is limited to a size of about 0.125 of an inch, filtering passage of any particle larger than 0.125 of an inch in size.

* * * * *